(12) United States Patent  (10) Patent No.: US 6,427,136 B2
Obitsu  (45) Date of Patent: *Jul. 30, 2002

(54) SOUND DEVICE FOR EXPANSION STATION (75) Inventor: Toshiro Obitsu, Inagi (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,426

(22) Filed: Sep. 1, 1998

(30) Foreign Application Priority Data

Feb. 16, 1998 (JP) .......................... 10-033226

(51) Int. Cl.[7] .............................................. G10L 21/00
(52) U.S. Cl. ...................................... 704/270; 704/278
(58) Field of Search ................................ 704/205, 206, 704/208, 210, 270, 278; 395/822; 381/57, 120

(56) References Cited

U.S. PATENT DOCUMENTS

| 5,148,484 A | * | 9/1992 | Kane et al. ................ 704/214 |
| 5,357,595 A | * | 10/1994 | Sudoh et al. .............. 704/215 |
| 5,548,638 A | * | 8/1996 | Yamaguchi et al. ....... 379/202 |
| 5,592,545 A | * | 1/1997 | Ho et al. .................... 379/347 |
| 5,611,018 A | * | 3/1997 | Tanaka et al. ............. 704/215 |
| 5,652,843 A | * | 7/1997 | Kane et al. ................ 704/208 |
| 5,689,615 A | * | 11/1997 | Benyassine et al. ....... 704/219 |
| 5,717,818 A | * | 2/1998 | Nejime et al. ............. 704/211 |
| 5,742,930 A | * | 4/1998 | Howitt ....................... 704/502 |
| 5,787,399 A | * | 7/1998 | Lee et al. .................. 704/270 |
| 5,845,240 A | * | 12/1998 | Fielder ...................... 704/201 |
| 5,864,793 A | * | 1/1999 | Mesiwala .................. 704/214 |
| 5,896,449 A | * | 4/1999 | Oshidari et al. ........... 379/347 |
| 5,977,469 A | * | 11/1999 | Smith et al. ............... 84/267 |
| 6,007,228 A | * | 12/1999 | Agarwal et al. ........... 700/94 |

OTHER PUBLICATIONS

Yap et al, "Designing a PC–based Real–time Speech Communication", 1999 IEEE Multimedia Signal Processing, Sep. 13, 1999.*
Japanese Laid–Open Patent Appln. No. 6–16485 dated Jun. 10, 1994.
Japanese Laid–Open Patent Appln. No. 58–96448 dated Jun. 8, 1983.

* cited by examiner

Primary Examiner—Fan Tsang
Assistant Examiner—Michael N. Opsasnick
(74) Attorney, Agent, or Firm—Armstrong, Westerman, Hattori, McLeland & Naughton, LLP (57) ABSTRACT A sound device includes a silent state detecting unit for detecting a silent state in a sound signal supplied by a personal computer; and a sound production preventing unit for preventing a sound from being produced from the sound signal supplied by the personal computer when the silent state is detected by the silent state detecting unit. By halting the production of a sound from the sound signal supplied from the personal computer when the silent state is detected, production of noise in a silent state is prevented so that the quality of sound in the expansion station is improved.

8 Claims, 6 Drawing Sheets

SOUND DEVICE FOR EXPANSION STATION

BACKGROUND OF THE INVENTION

1. Field of the Invention

The present invention relates to a sound device of an expansion station and, more particularly, to a sound device of an expansion station for a notebook personal computer and which removes noise of a sound signal supplied from the personal computer.

Recently, minimum facilities are provided in a notebook personal computer so that the mobility thereof is improved by realizing a compact and thin body. Expanded facilities are provided in an expansion station connectable to the notebook personal computer.

2. Description of the Related Art

Figure 1:
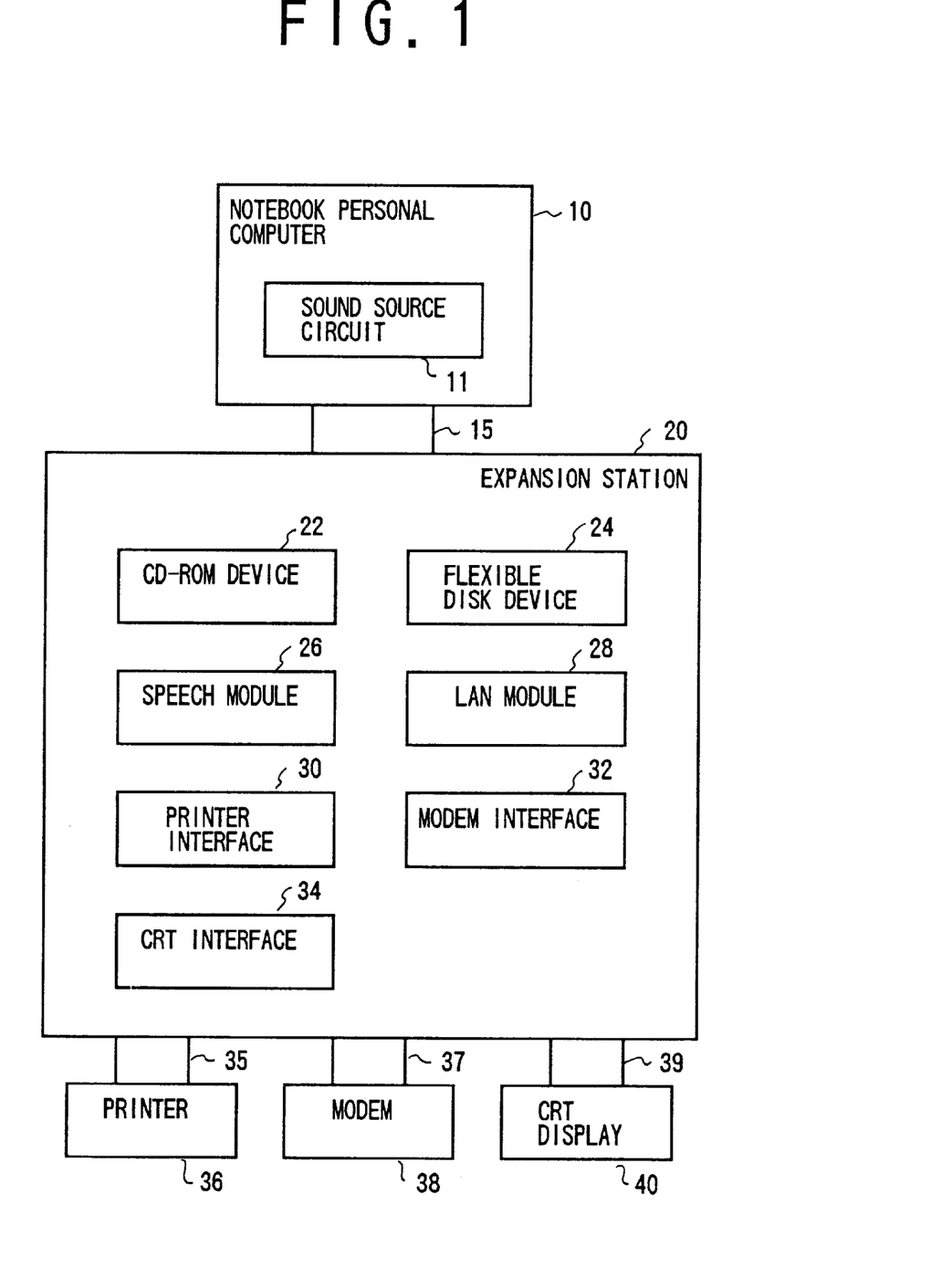
FIG. 1 shows a connection between a notebook personal computer and an expansion station.

FIG. 1 shows a connection between a notebook personal computer and an expansion station.

For example, referring to FIG. 1, a notebook personal computer 10 is connected to an expansion station 20 by a 220-pin connector 15. Various facilities including a CD-ROM device 22, a flexible disk device 24, a sound module (sound device) 26, a LAN module 28, a printer interface 30, a modem interface 32, a CRT interface 34 are provided in the expansion station 20. A printer 36 is connected to the connector 35, a modem 38 is connected to a connector 37, and a CRT display 40 is connected to a connector 39.

The various facilities in the expansion station 20 including the CD-ROM device 22, the flexible disk device 24, the sound module 26, the LAN module 28, the printer interface 30, the modem interface 32, the CRT interface 34 operate according to respective instructions from the notebook personal computer 10. For example, the sound module 26 is supplied with an analog speech signal generated by a sound source circuit built in the notebook personal computer 10 via the connector 15. The sound module 26 amplifies this speech signal using a built-in high-performance amplifier (high-performance as compared to an amplifier built in the notebook personal computer) and causes a high-performance speaker to give an associated sound.

A power supply of a sound source circuit of the notebook personal computer 10 is different from a power supply of the sound module 26 of the expansion station 20. When the notebook personal computer 10 is connected to the expansion station 20, sound noise is generated when there is a potential difference between the power supply voltage levels or between the ground levels. It is also difficult to provide precise impedance matching between the sound source circuit of the notebook personal computer 10 and the sound module 26 of the expansion station 20. Therefore, sound noise occurs due to impedance mismatching. There is a problem in that such sound noise does not stand out while a sound is being produced but is distinctively heard in a silent state.

Japanese Laid-Open Patent No. 58-96448 discloses a device for automatically cutting off a power supply of a device after a predetermined period of time has elapsed since a speech signal is detected to carry no information.

Japanese Laid-Open Patent Application 4-164485 discloses detecting a silence (absence of a received sound) in a call proceeding in a cordless telephone set, generating a control signal in the silence state and cutting off a power supply of the telephone set except that for a silence distinction unit.

When the device described in Japanese Laid-Open Patent No. 58-96448 is applied to the sound module 26 of the expansion station 20, the power supply of the sound module 26 is cut off after a predetermined period of time has elapsed since a silence is detected. There is a problem in that, when a speech signal is supplied from the sound source circuit of the notebook personal computer 10 subsequently, the sound module 26 cannot produce a sound.

When the device described in Japanese Laid-Open Patent No. 4-164485 is applied to the sound module 26 of the expansion station 20, the power supply of the sound module 26 is cut off after a predetermined period of time has elapsed since a silence is detected. There is a problem in that, when a speech signal is supplied from the sound source circuit of the notebook personal computer 10 subsequently, the sound module 26 cannot produce a sound.

SUMMARY OF THE INVENTION

Accordingly, an object of the present invention is to provide a sound device in which the aforementioned problems are eliminated.

Another and more specific object of the present invention is to provide a sound device of an expansion station in which noise is prevented from being produced in a silent state, and in which the sound quality in the expansion station is improved.

The aforementioned object can be achieved by a sound device provided in an expansion station for a notebook personal computer and supplied with a sound signal from the personal computer so as to produce a sound, comprising: silent state detecting means for detecting a silent state in the sound signal supplied by the personal computer; and sound production preventing means for preventing a sound from being produced from the sound signal supplied by the personal computer when the silent state is detected by the silent state detecting means.

By preventing a sound from being produced from the sound signal supplied from the personal computer when a silent state is detected by the silent state detecting means, noise is prevented from being produced in a silent state. With this, the sound quality of an expansion station is improved.

The sound device may further comprise:
frequency detecting means for detecting a noise frequency of the sound signal supplied by the personal computer when the silent state is detected by the silent state detecting means; storage means for storing the noise frequency detected by the frequency detecting means; filter means for attenuating components of the sound signal at a stored noise frequency stored in the storage means, when the silent state is not detected.

By detecting a noise frequency of the sound signal supplied from the personal computer in a silent state and by attenuating components at the noise frequency in the sound signal supplied from the personal computer when a sound is being produced, noise is removed from the sound derived from the sound signal supplied from the personal computer.

The sound device may further comprise: output amplifying means for amplifying the sound signal for the purpose of sound production; and detection amplifying means for amplifying the sound signal for the purpose of detecting the silent state.

By providing the detection amplifying means for amplifying the sound signal for the purpose of detecting a silent state, in addition to the output amplifying means for amplifying the sound signal for the purpose of sound production, the silent state can be detected with a high precision by controlling the degree of amplification by the detection amplifying means.

The sound device may further comprise switch means for suspending a power supply to the output amplifying means and the filter means, when the silent state detecting means detects the silent state.

By preventing a power supply to the output amplifying means and the filter means when the silent state is detected by the silent state detecting means, power consumption in the silent state is reduced.

The sound device may further comprise switch means for preventing a supply of the sound signal output by the detection amplifying means to the silent state detecting means, when a silent state is not detected.

By preventing the sound signal output by the detection amplifying means from being supplied to the silent state detecting means when the silent state is not detected, the sound signal at an excessively high level is prevented from being supplied to the silent state detecting means when a sound is being produced.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Figure 2:
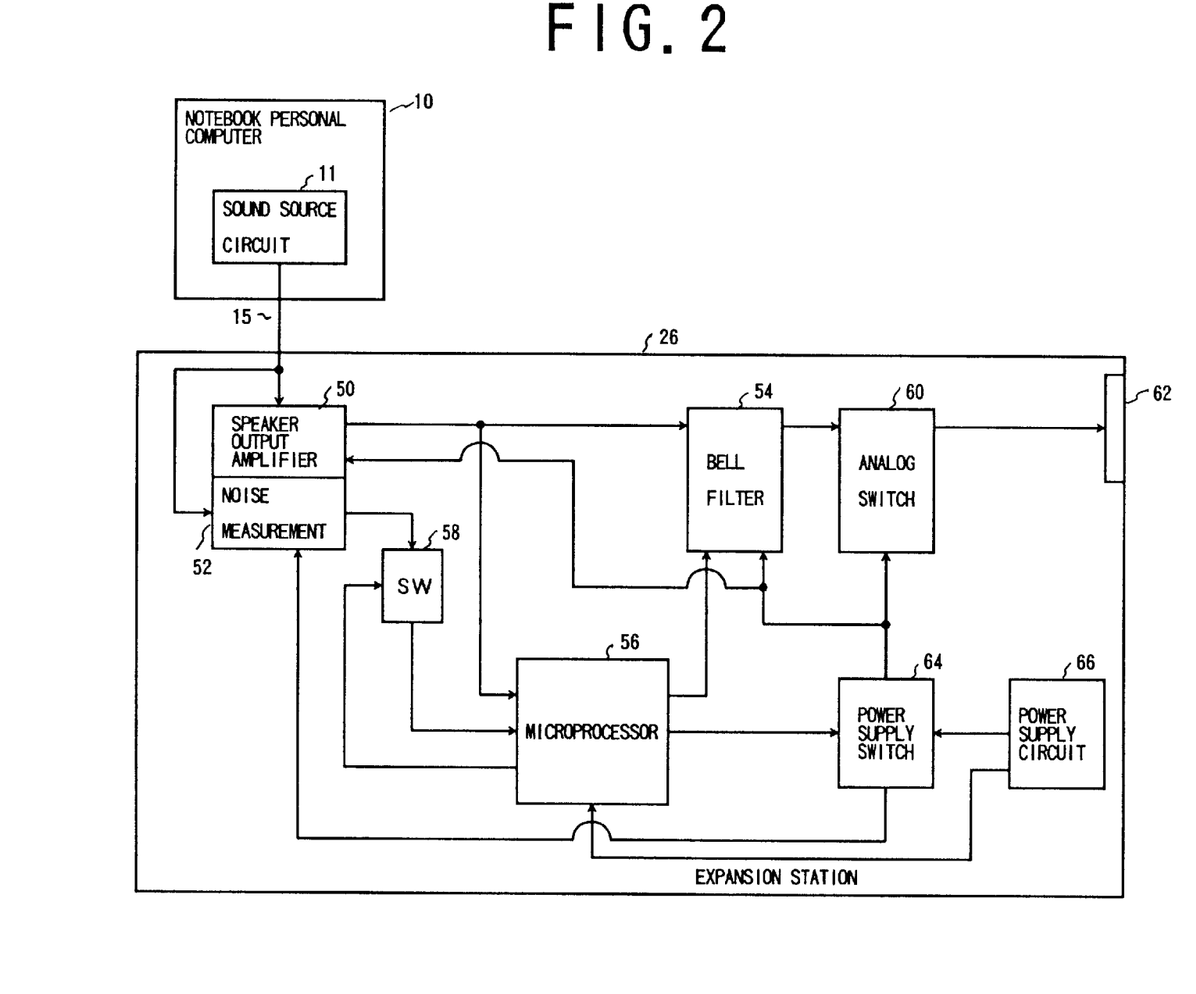
FIG. 2 shows a construction of an expansion station according to an embodiment of the present invention.

FIG. 2 shows a construction of an expansion station according to an embodiment of the present invention to which a sound device of the present invention is applied. Referring to FIG. 2, an analog speech signal (sound signal) output by a sound source circuit 11 built into a notebook personal computer 10 is supplied in parallel via a connector 15 to an amplifier 50 for a speaker output (hereinafter, referred to as the speaker output amplifier 50) and a noise measurement amplifier 52. The speaker output amplifier 50 and the noise measurement amplifier 52 are built into a sound module (sound device) 26 provided in an expansion station 20. The speaker output amplifier 50 has a normal gain sufficient to amplify the speech signal to a level providing an audible output through the speaker. The speech signal amplified by the speaker output amplifier 50 is supplied to a Bell filter 54, a microprocessor 56 and a noise measurement switch 58. The speech signal output by the Bell filter 54 is supplied to an analog switch 60. When the analog switch 60 conducts, the speech signal is supplied to a speaker 62 via the analog switch 60 so that a sound is produced.

The noise measurement amplifier 52 has a gain several times as high as a normal gain. The sound signal amplified by the noise measurement amplifier 52 is supplied to the noise measurement switch 58. The noise measurement switch 58 is controlled by the microprocessor 56 to be turned on or off. When the noise measurement switch 58 is turned on, the speech signal output by the noise measurement amplifier 52 is supplied to the microprocessor 56.

When the noise measurement switch 58 is turned off, the microprocessor 56 selects the sound signal supplied from the speaker output amplifier 50. When the noise measurement switch 58 is turned on, the microprocessor 56 selects the sound signal output by the noise measurement amplifier 52 and digitize the sound signal using a built-in AD converter so as to perform switching control of the Bell filter 54 and a power supply switch 64 according to a digital sound signal level. When the power supply of the expansion station 20 is on, the power supply circuit 66 continues to supply a power supply for operation to the noise measurement amplifier 52, the microprocessor 56 and the power supply switch 64. The power supply switch 64 is controlled by the microprocessor 56 to selectively supply a power supply from the power supply circuit 66 to the speaker output amplifier 50, the Bell filter 54 and the analog switch 60. Moreover, the microprocessor 56 selectively controls the power supply from the power supply circuit 66 to the noise measurement amplifier 52.

Figure 3:
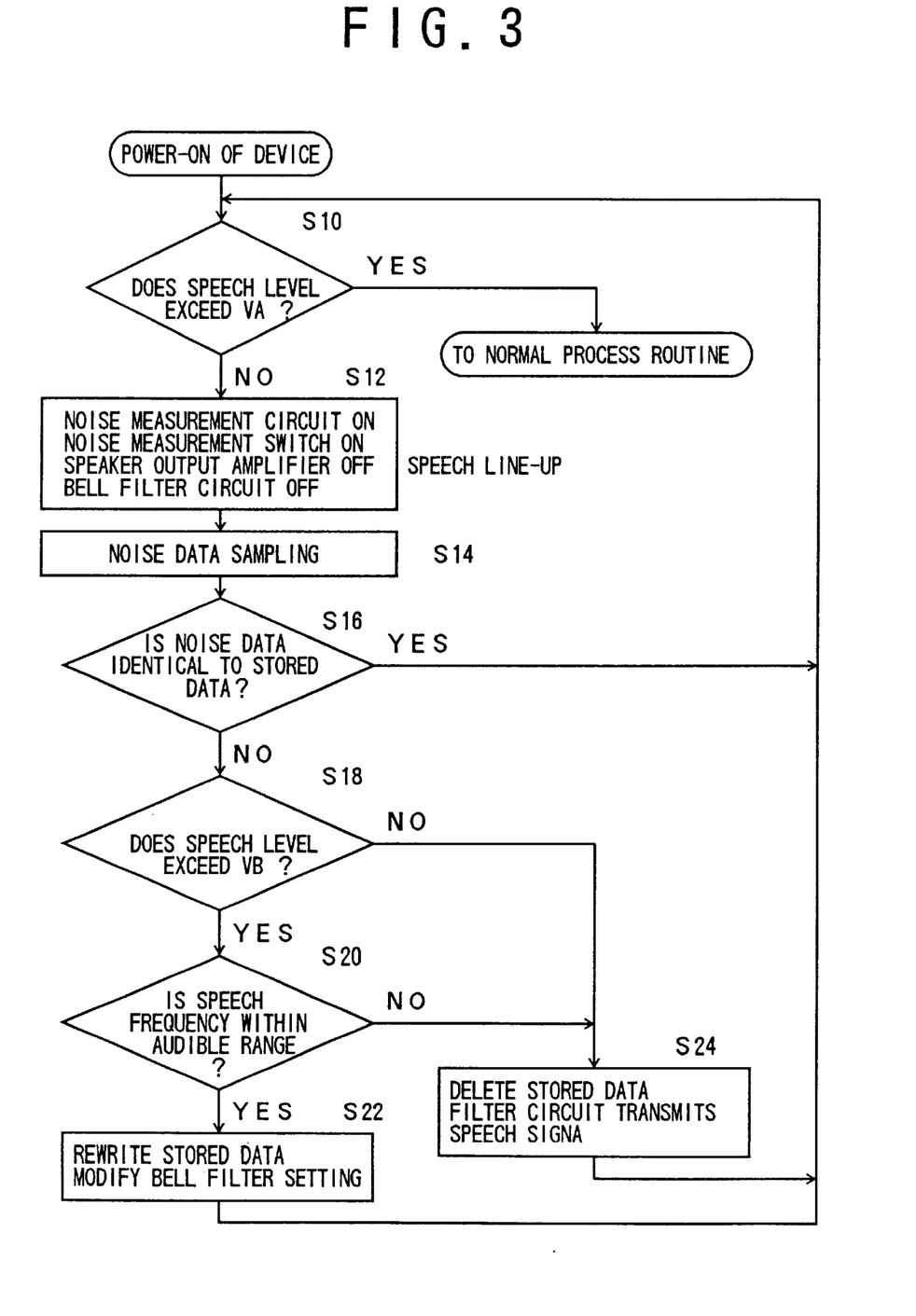
FIG. 3 is a flowchart of a noise pattern storage process executed by a microprocessor executes according to an embodiment of the present invention.

FIG. 3 is a flowchart of a noise pattern storage process executed by the microprocessor 56 according to an embodiment of the present invention. When the operation is started, the microprocessor 56 causes the noise measurement switch 58 to select the sound signal output by the speaker output amplifier 50. Referring to FIG. 3, in step S10, the microprocessor 56 continually samples the sound signal output by the speaker output amplifier 50 for a predetermined period of time (for example, three seconds) and determines whether the sound signal continues to exceed a predetermined reference level VA (for example, 0.06 V). If the speech signal level continues to exceed the reference level VA for a predetermined period of time, the microprocessor 56 determines that a sound is being produced and proceeds to a normal process routine to be described later.

If the sound signal level is below the reference level VA, the microprocessor 56 determines that no sound is being produced and proceeds to step S12. In step S12, the microprocessor 56 controls the power supply switch 64 to provide a power supply to the noise measurement amplifier 52 and turns on the noise measurement switch 58 so as to supply the sound signal output by the noise measurement amplifier 52 to the microprocessor 56. The microprocessor 56 also controls the power supply switch 64 so as to suspend the power supply to the speaker output amplifier 50, the Bell filter 54 and the analog switch 60.

With this, noise is prevented from being produced from the speaker 62. Power consumption in the speaker output amplifier 50, the Bell filter 54 and the analog switch 60 is suspended so that the power consumption is reduced.

In step S16, the microprocessor 56 continually samples the sound signal output by the noise measurement amplifier 52 for a predetermined period of time (for example, three seconds) and detects a peak level and a peak frequency of noise. In step S16, the microprocessor 56 determines whether the currently detected peak frequency of the noise matches the peak frequency of noise detected and stored previously, and, if the peak frequencies match, proceeds to step S18. If the peak frequencies do not match, the microprocessor proceeds to step S10.

In step S18, the microprocessor 56 determines whether the peak level of noise sampled in step S16 exceeds a predetermined reference level VB (for example, 0.02 V). If the peak level of noise exceeds the predetermined reference level VB, the microprocessor 56 proceeds to step S24. If the peak level of noise is below the predetermined reference level VB, the microprocessor 56 proceeds to step S20. In step S20, the microprocessor 56 determines whether the peak frequency of noise sampled in step S16 is within an audible frequency range (on the order of 2–100 KHz). If the peak frequency of noise is outside the audible frequency range, the microprocessor proceeds to step S24. If the peak frequency of noise is within the audible frequency range, the microprocessor 56 proceeds to step S22.

In step S22, the microprocessor 56 replaces the peak frequency of noise already stored in a built-in memory by the currently detected peak frequency of noise and proceeds to step S10. With this, the frequency of the speech signal attenuated by the Bell filter 54 is varied. In step S24, the peak frequency of noise stored previously is erased and the microprocessor 56 proceeds to step S10. With this, the Bell filter 54 transmits the speech signal without attenuating the same.

Figure 4:
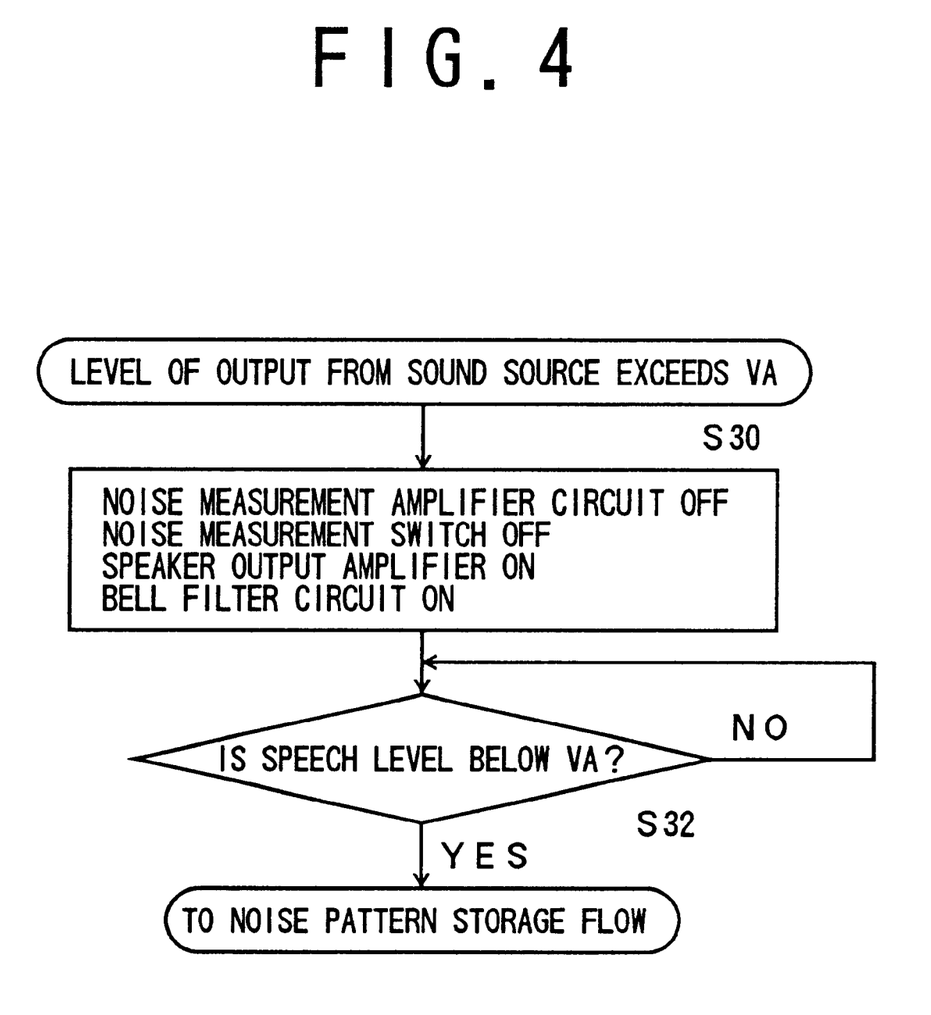
FIG. 4 is a flowchart showing a normal process executed by the microprocessor according to an embodiment of the present invention.

FIG. 4 is a flowchart showing a normal process executed by the microprocessor 56 according to an embodiment of the present invention.

This process is started when it is determined, as a result of continuous sampling for a predetermined period of time (for example, three seconds) in step S10 of FIG. 3, that the speech signal output by the speaker output amplifier 50 continues to exceed a predetermined standard level VA (for example, 0.06 V). Referring to FIG. 4, in step S30, the microprocessor 56 controls the power supply switch 64 to stop a power supply to the noise measurement amplifier 52, turns the noise measurement switch 58 off, and stops supplying the speech signal output by the noise measurement amplifier 52 to the microprocessor 56. The microprocessor 56 controls the power supply switch 64 so as to supply a power to the speaker output amplifier 50, the Bell filter 54 and the analog switch 60. The microprocessor 56 generates a selection control signal to reduce a noise peak frequency written in step S22 and supplies the selection control signal to the Bell filter 54.

With this, the speech signal from the sound source circuit 11 built in the notebook personal computer 10 is supplied to the speaker 62 via the speaker output amplifier 50, the Bell filter 54 and the analog switch 60 so that a sound is produced.

In step S32, the microprocessor 56 samples the speech signal output by the speaker output amplifier 50 and determines whether the speech signal exceeds a predetermined standard level VA (for example, 0.06V). If the level of the speech signal exceeds the standard value VA, a determination is made that a sound is being produced, whereupon step S32 is repeated. If the speech signal level is at a level below the standard value VA, a determination of a silent state is given, whereupon a noise pattern registration process of FIG. 3 is performed.

Figure 5:
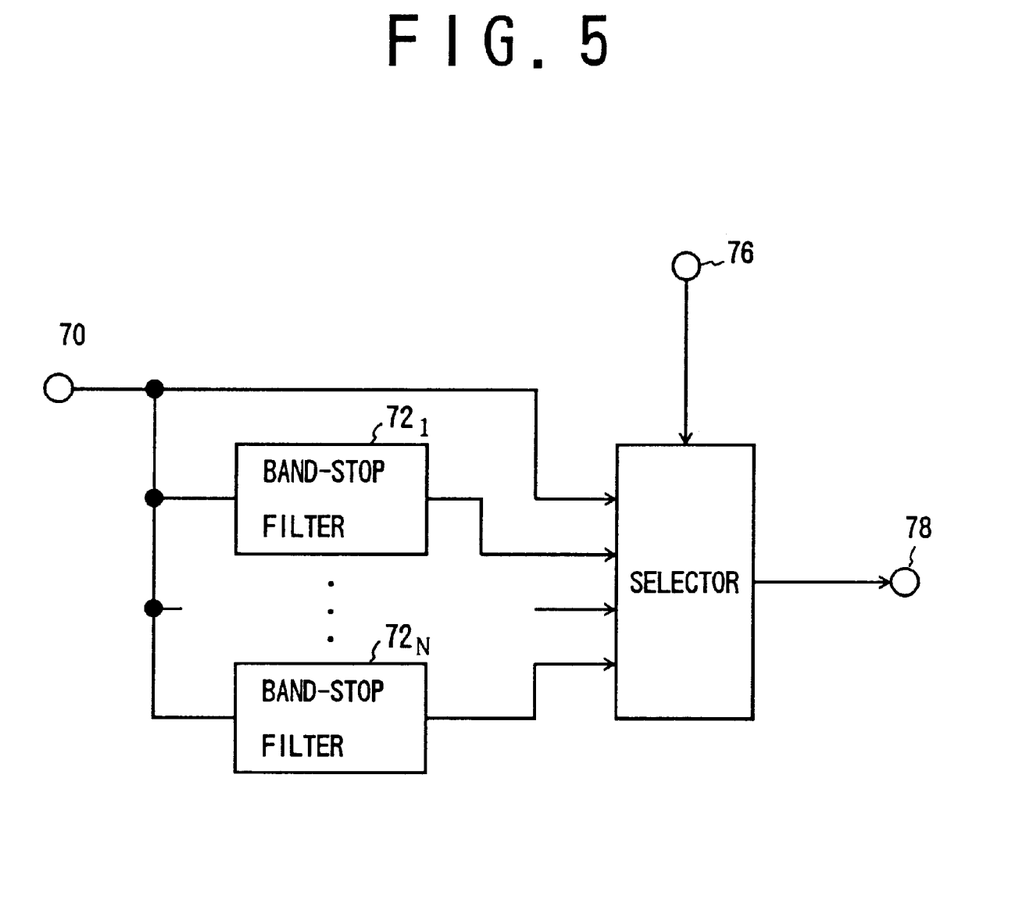
FIG. 5 is a block diagram showing a Bell filter according to an embodiment of the present invention.

FIG. 5 is a block diagram showing the Bell filter 54 according to an embodiment of the present invention. Referring to FIG. 5, a speech signal arrives at a terminal 70 from the speaker output amplifier 50 and is supplied to band-stop filters 721–72N. The band-stop filters 721–72N are characterized by different attenuation frequencies in a speech frequency range. The speech signal attenuated by each of the band-stop filters 721–72N is supplied to a selector 74. In addition, a speech signal is directly supplied from the terminal 70 to the selector 74. The selector 74 selects one of the speech signals supplied from the terminal 70 and the band-stop filters 721–72N, in accordance with the selection control signal supplied from a microprocessor 56 to the terminal 76, and outputs the selected speech signal to the terminal 78.

Figure 6:
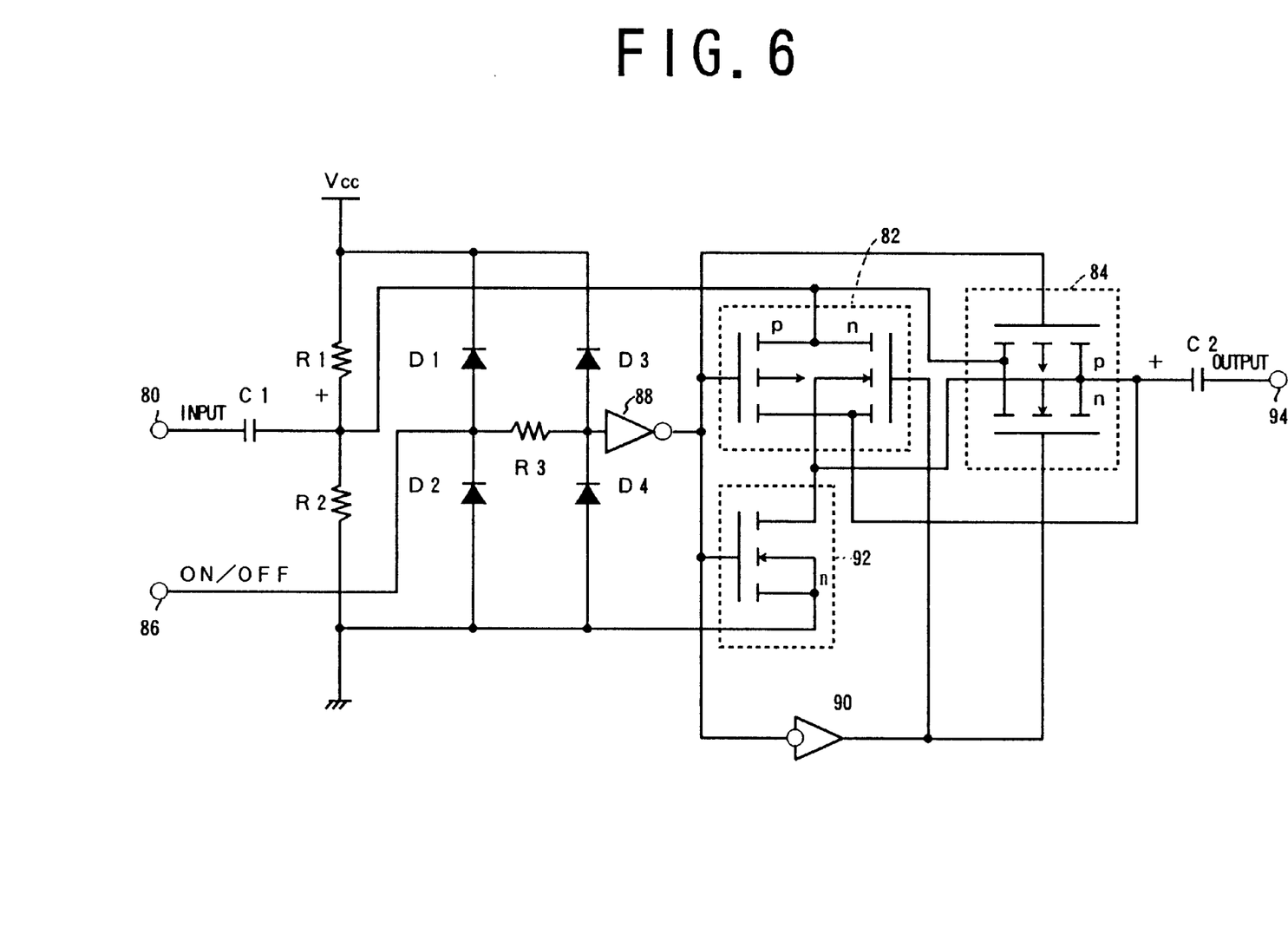
FIG. 6 shows a circuit construction of an analog switch according to an embodiment of the present invention.

FIG. 6 shows a circuit construction of the analog switch 60 according to an embodiment of the present invention. Referring to FIG. 6, the speech signal output by the Bell filter 54 arrives at a terminal 80 and is transmitted through the capacitor C1. A direct current from a joint between the resistors R1 and R2 provided between the power supply terminal Vcc and the ground terminal is added (offset) to the speech signal. The resultant speech signal is supplied to input terminals of the switches 82 and 84 each consisting of an n-channel MOS transistor and a p-channel MOS transistor.

An on/off control signal is supplied from the microprocessor 56 to the terminal 86, and this control signal has a high-level voltage and a low-level voltage thereof limited by a limiter consisting of a resistor R3 and diodes D1–D4 before being supplied to an inverter 88. The control signal inverted by the inverter 88 is supplied to the gate of the p-channel MOS transistors of the switches 82 and 84, supplied to the gate of the n-channel MOS transistors constituting a switch 92, and also supplied to an inverter 90.

The control signal converted into a non-inverted signal by the inverter 90 is supplied to the gate of the n-channel MOS transistors of the switches 82 and 84. The switch 92 is provided to ground the output terminal of the switches 82 and 84 in an on state. The output terminals of the switches 82 and 84 are connected to an output terminal 94 via the capacitor C2. The switches 82 and 84 are provided in parallel in order to reduce the resistance.

When the control signal from the terminal 86 is at a high level, the switch 92 is turned off, the n-channel MOS transistors and the p-channel MOS transistors of the switches 82 and 84 are turned on, and the speech signal supplied via the terminal 80 is output from the output terminal 94.

When the control signal from the terminal 86 is at a low level, the switch 92 is turned on, the n-channel MOS transistors and the p-channel MOS transistors of the switches 82, 84 are turned off, and the output terminal 94 is put in a grounded state.

Noise generated due to a difference between the power supply of the sound source circuit of the notebook personal computer 10 and the power supply of the sound module 26 of the expansion station 20, and noise generated due to impedance mismatching between the sound source circuit of the notebook personal computer 10 and the sound module 26 of the expansion station 20 are prevented from being produced in a silence state, by preventing a sound from being produced from the speech signal supplied from the notebook personal computer 10 when a silence state is detected. With this, the sound quality in the expansion station is improved.

By detecting the frequency of noise in the speech signal supplied from the notebook personal computer 10 in a silence state, and by reducing components at the noise frequency of the speech signal supplied from the personal computer when a sound is given, noise is removed from the speech signal supplied from the personal computer before a sound is produced.

In addition to the speaker output amplifier 50 for amplifying the speech signal to a level providing an audible output, the noise measurement amplifier 52 for amplifying the speech signal for detection of a silent state is provided. Accordingly, a highly precise detection of a silence state is enabled by controlling the degree of amplification by the noise measurement amplifier 52. Power consumption in a silent state can be reduced by stopping the supply of a power to the speaker output amplifier 50 and the Bell filter 54. An excessively high-level speech signal is prevented from being supplied to the microprocessor 56 when a sound is being produced by controlling the switch 58 to stop the supply of the speech signal output by the noise measurement amplifier 52 to the microprocessor 56.

Step S10 corresponds to the silent state detecting means, the analog switch 60 corresponds to the sound production preventing means, step S22 corresponds to the frequency detecting means, and the memory built in the microprocessor 56 corresponds to the storage means, the Bell filter 54 corresponds to the filter means, the speaker output amplifier 50 corresponds to the output amplification means, the noise measurement amplifier 52 corresponds to the detection amplification means, and the switch 58 corresponds to the switch means.

The present invention is not limited to the above-described embodiments, and variations and modifications may be made without departing from the scope of the present invention.

What is claimed is:

1. A sound device provided in an expansion station for a computer and supplied with a sound signal from the computer so as to produce a sound, comprising:

a silent state detecting unit for detecting a silent state in the sound signal supplied by the computer;

a sound production preventing unit for preventing a sound from being produced from said sound signal supplied by the computer when the silent state is detected by said silent state detecting unit;

said sound detecting unit for detecting a sound signal that exceeds a predetermined reference level supplied by the computer subsequent to the detected silent state;

a frequency detecting unit for detecting a noise frequency of said sound signal supplied by the computer when the silent state is detected by said silent state detecting unit;

a storage unit for storing the noise frequency detected by said frequency detecting unit; and a filter unit for attenuating components of said sound signal at a stored noise frequency stored in said storage unit, when the silent state is not detected.

2. The sound device as claimed in claim 1, further comprising:

an output amplifying unit for amplifying the sound signal for the purpose of sound production; and a detection amplifying unit for amplifying the sound signal for the purpose of detecting the silent state.

3. The sound device as claimed in claim 2, further comprising a switch unit for suspending a power supply to said output amplifying unit and a bell filter unit, when said silent state detecting unit detects the silent state.

4. The sound device as claimed in claim 2, further comprising a switch unit for preventing a supply of the sound signal output by said detection amplifying unit to said silent state detecting unit, when a silent state is not detected.

5. A sound device provided in an expansion station for a computer and supplied with a sound signal from the computer so as to produce a sound, comprising:

a silent state detector detecting a silent state in said sound signal supplied by the computer;

a sound production preventor preventing a sound from being produced from said sound signal supplied by the computer when the silent state is detected by said silent state detector;

a sound detector detecting said sound signal that exceeds a predetermined reference level supplied by the computer subsequent to the detected silent state;

a frequency detector detecting a noise frequency of said sound signal supplied by the computer when the silent state is detected by said silent state detector;

a storage unit for storing the noise frequency detected by said frequency detector; and a filter unit for attenuating components of the sound signal at a stored noise frequency stored in said storage unit, when the silent state is not detected.

6. The sound device as claimed in claim 5, further comprising:

an output amplifier amplifying the sound signal for the purpose of sound production; and a detection amplifier amplifying the sound signal for the purpose of detecting the silent state.

7. The sound device as claimed in claim 6, further comprising a switch unit for suspending a power supply to said output amplifier and a bell filter unit, when said silent state detector detects the silent state.

8. The sound device as claimed in claim 6, further comprising a switch unit for preventing a supply of the sound signal output by said detection amplifier to said silent state detector, when a silent state is not detected.

* * * * *